Sept. 15, 1964     E. R. ZIEGLER     3,148,399
WINDSHIELD CLEANING SYSTEM
Filed April 2, 1963                          8 Sheets-Sheet 1

INVENTOR.
EUGENE R. ZIEGLER
BY
HIS ATTORNEY

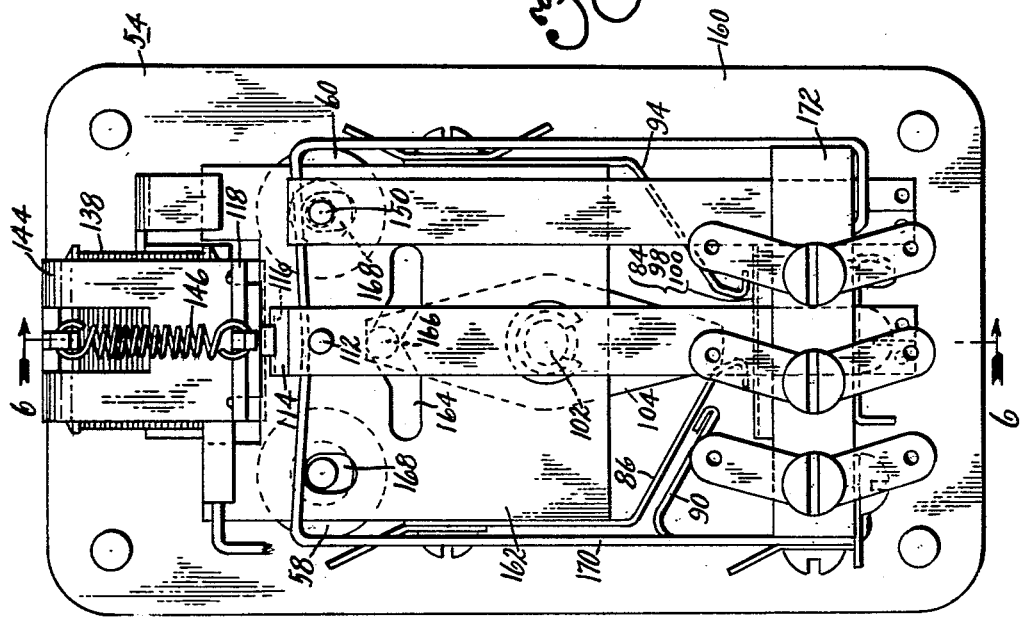
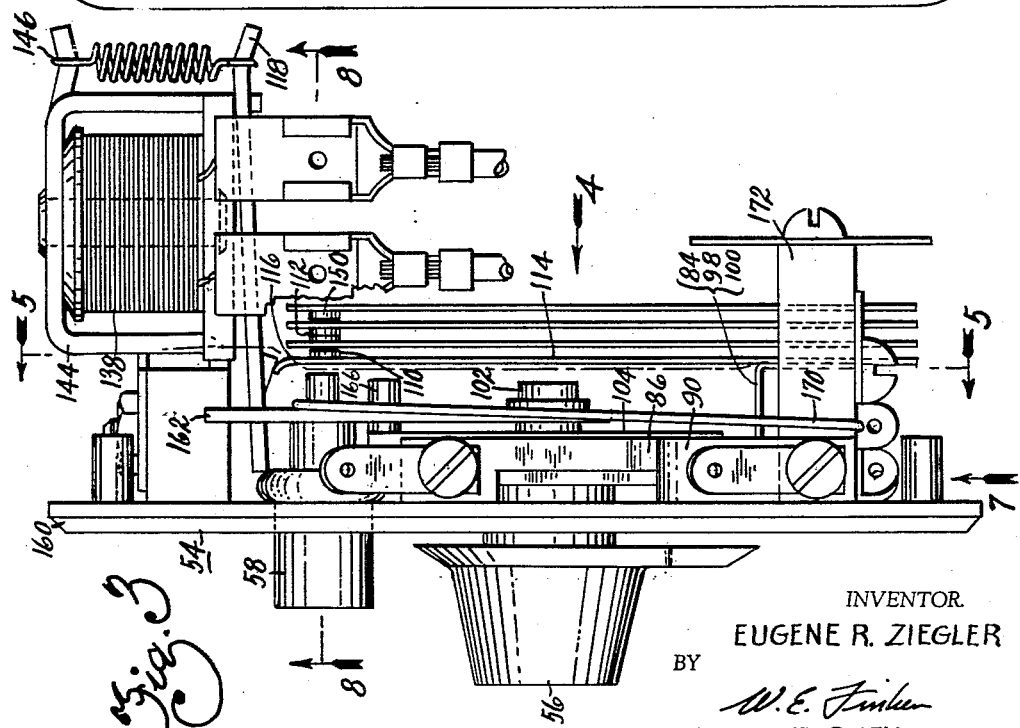
INVENTOR.
EUGENE R. ZIEGLER
BY
W. E. Finken
HIS ATTORNEY

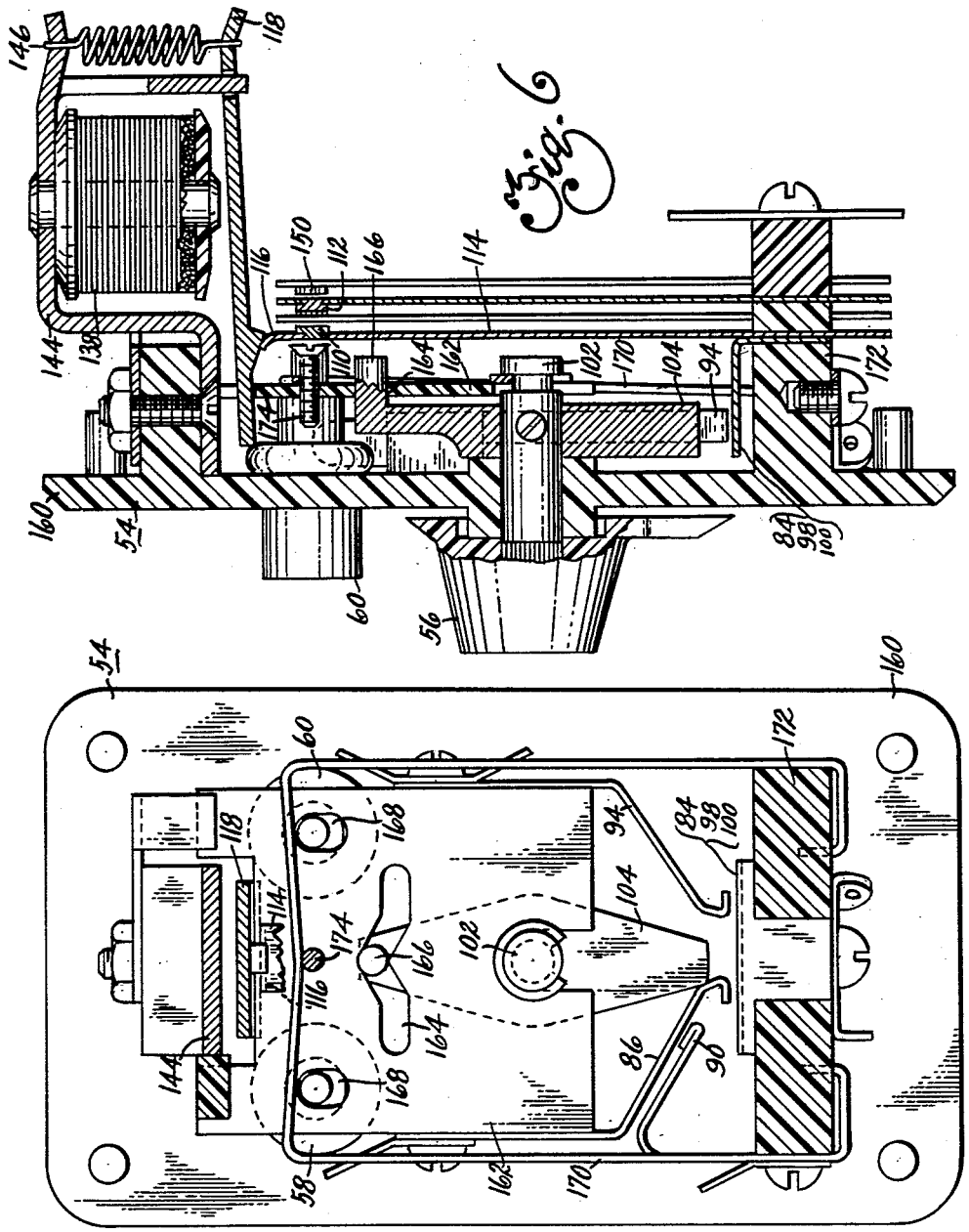

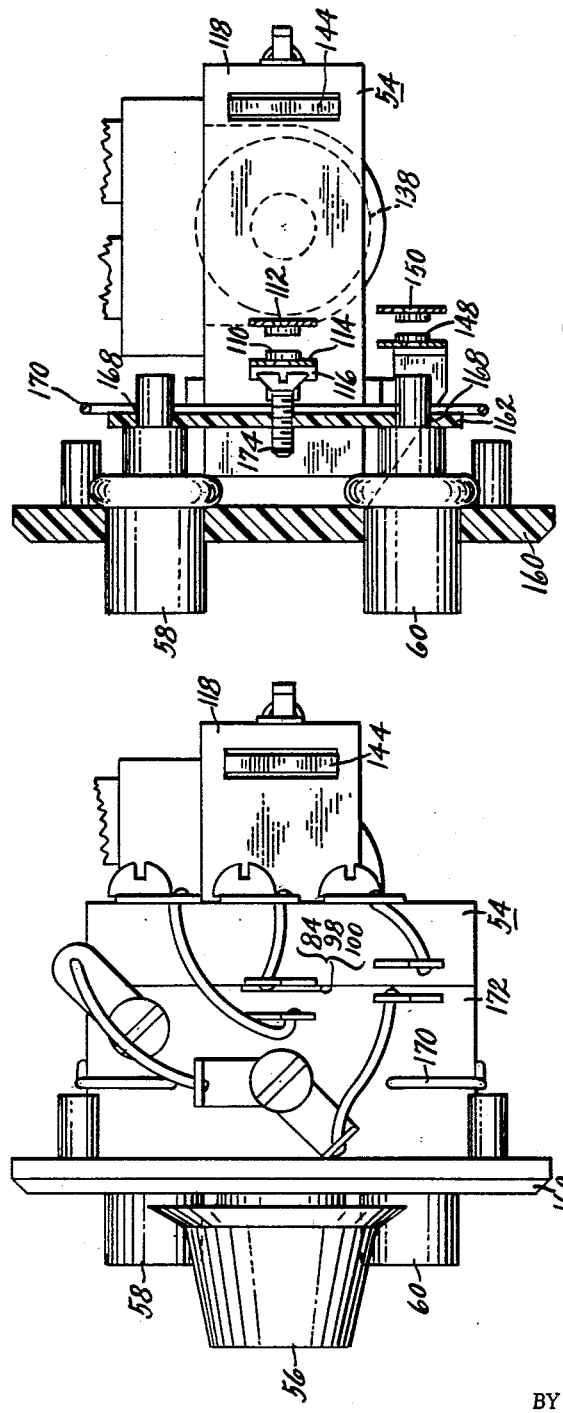

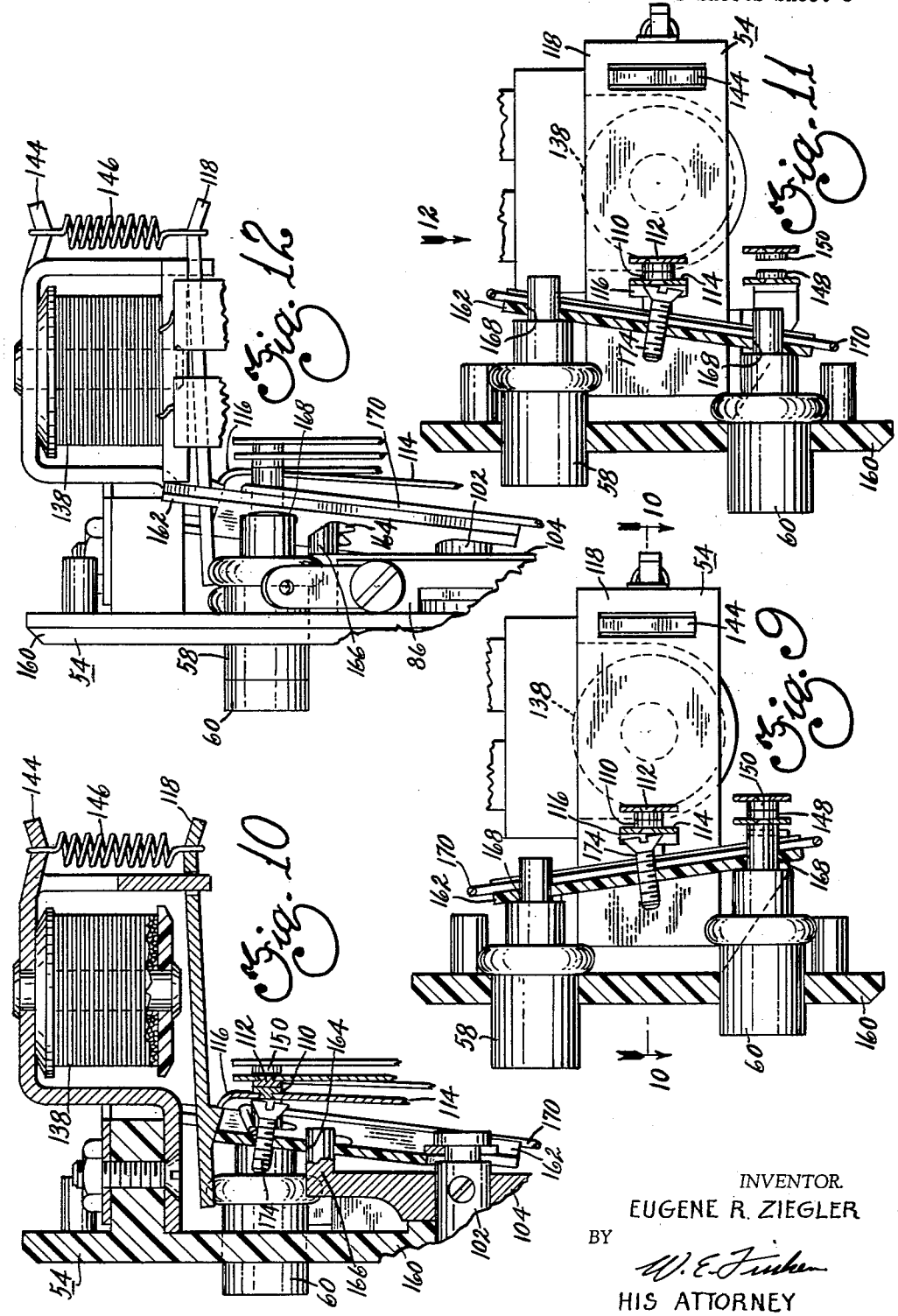

Sept. 15, 1964        E. R. ZIEGLER        3,148,399
WINDSHIELD CLEANING SYSTEM
Filed April 2, 1963        8 Sheets-Sheet 6
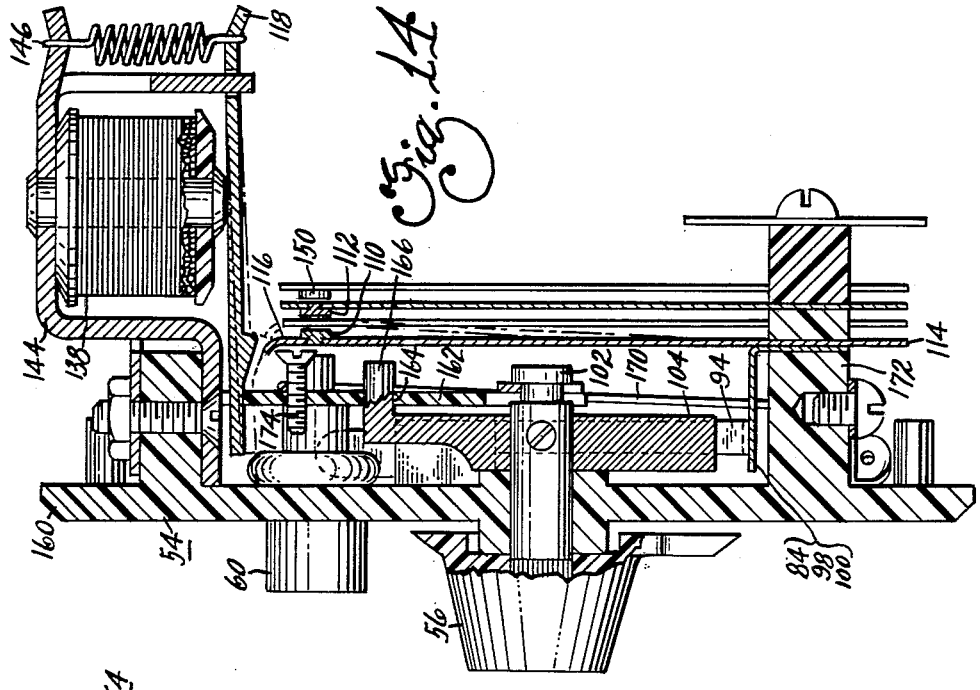
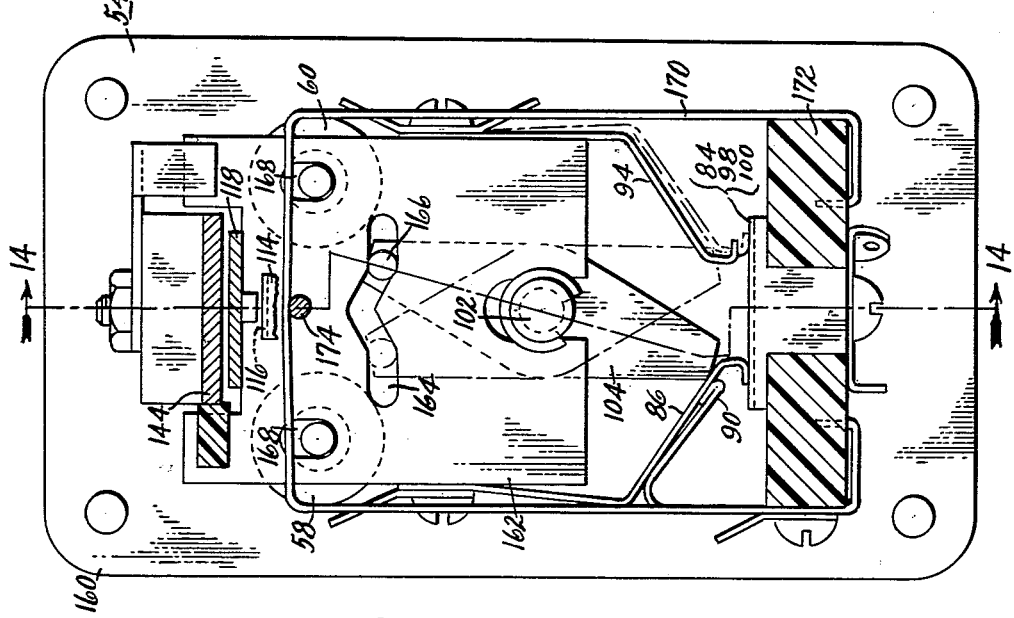
INVENTOR.
EUGENE R. ZIEGLER
BY
HIS ATTORNEY Sept. 15, 1964  E. R. ZIEGLER  3,148,399
WINDSHIELD CLEANING SYSTEM
Filed April 2, 1963  8 Sheets-Sheet 7
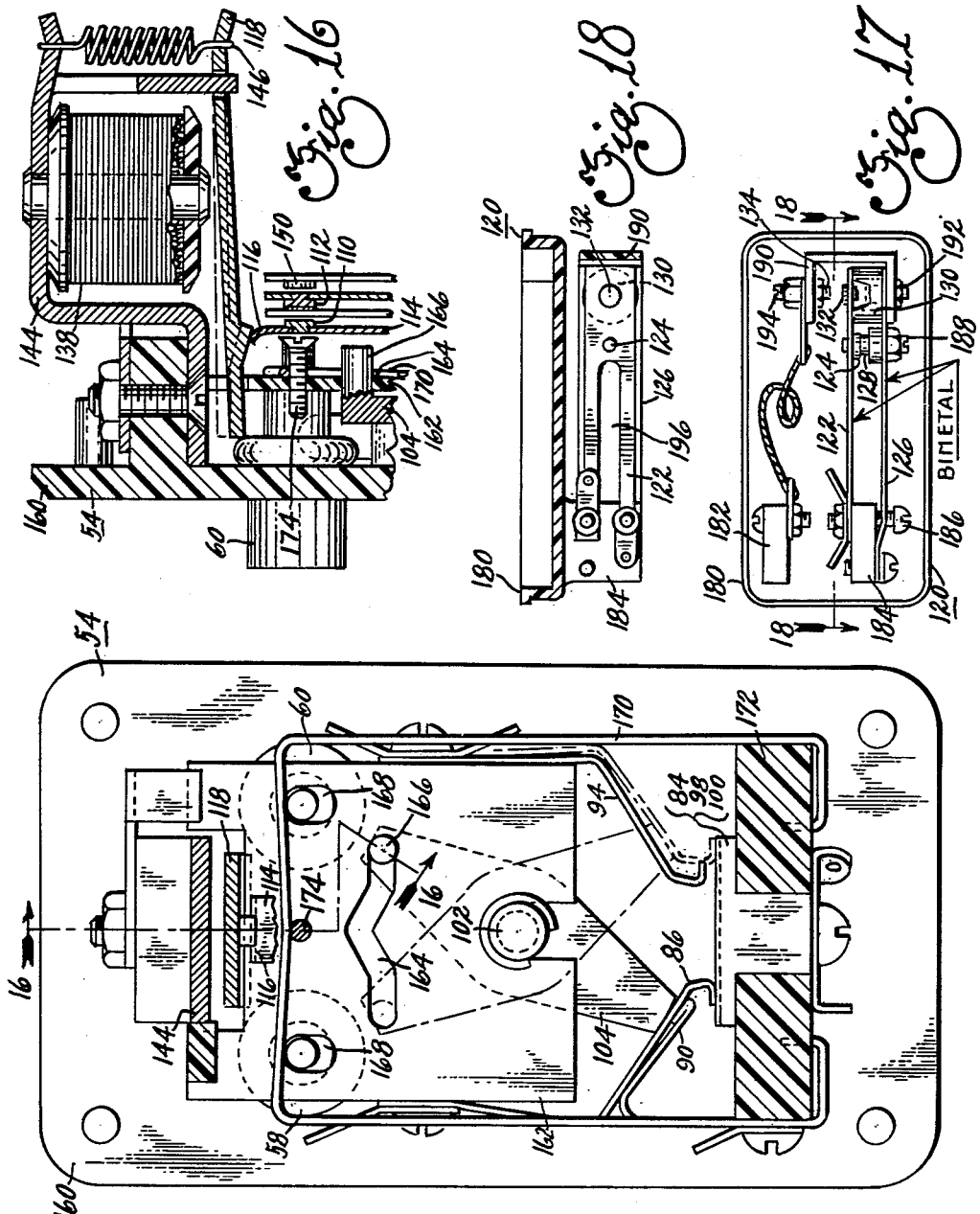
INVENTOR.
EUGENE R. ZIEGLER
BY
HIS ATTORNEY

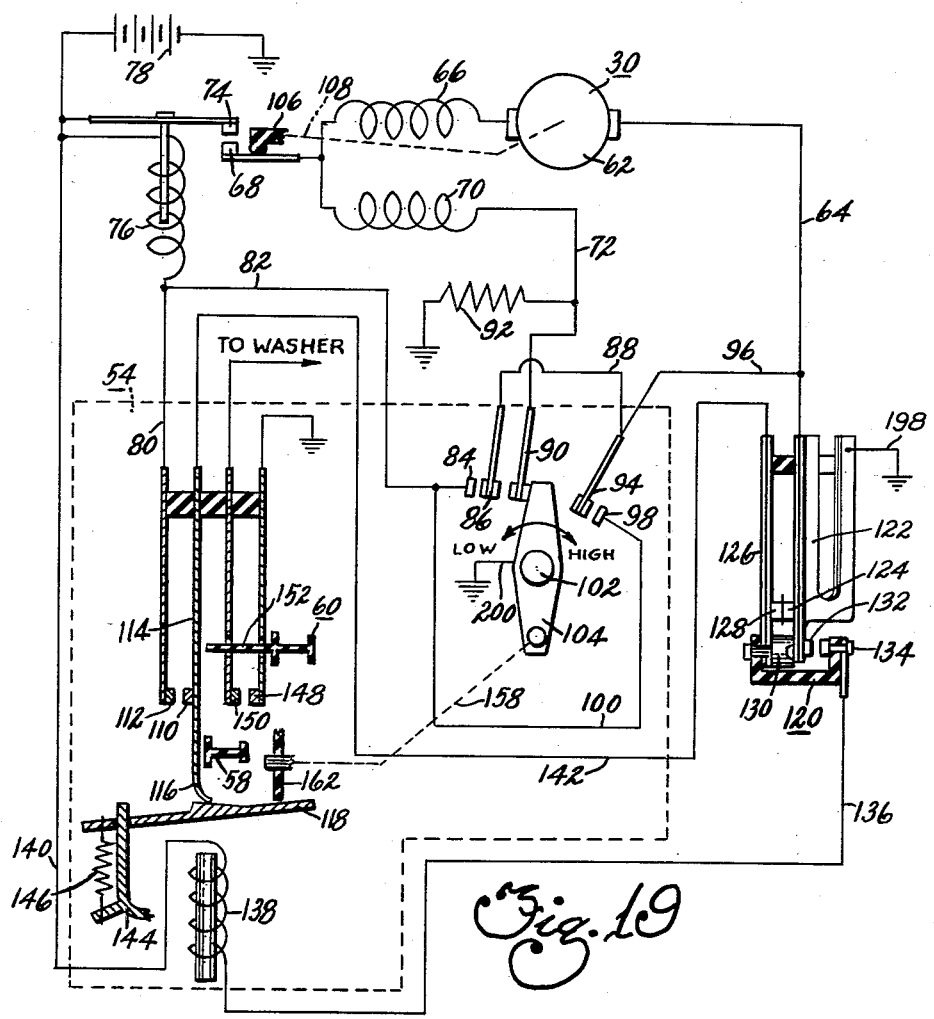
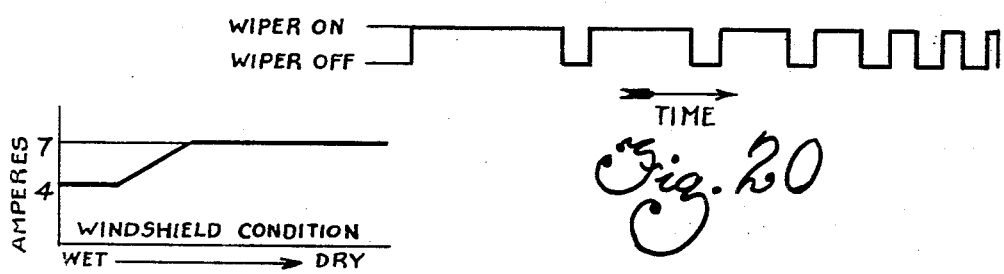

United States Patent Office 3,148,399
Patented Sept. 15, 1964

3,148,399
WINDSHIELD CLEANING SYSTEM
Eugene R. Ziegler, Spencerport, N.Y., assignor to General Motors Corporation, Detroit, Mich., a corporation of Delaware
Filed Apr. 2, 1963, Ser. No. 270,024
20 Claims. (Cl. 15—250.02)

This invention pertains to windshield cleaning systems, and particularly to an improved control for a windshield cleaning system comprising a wiper unit and a washer unit.

Heretofore, it has been proposed to operate a windshield cleaning system with automatic timed interruptions in its operation whereat the wiper is automatically arrested in its parked position during the intervening rest intervals. A control system of the aforesaid type for power driven wiper units is disclosed in copending application S.N. 48,132 filed August 8, 1960, now Patent No. 3,091,792, in the name of Loren R. Gute, of common assignee. Automatic intermittent operation of a wiper unit prevents the impairment of vision of the windshield under conditions of very mild precipitation. The present invention is directed to a completely automatic windshield cleaning system which includes windshield surface condition responsive means for controlling the interval of wiper unit operation with intervening rest periods, and progressively reducing the number of wiper cycles as the windshield is dried so as to automatically terminate wiper operation when the windshield is substantially completely dry. In addition, the present invention comprehends a control for a washer unit which, when activated, will automatically spray liquid solvent onto the windshield into the path of the wiper blades thereacross, which washer unit is automatically arrested, and after which the wiper unit control functions to completely dry the windshield by automatic and progressive intermittent operation as alluded to hereinbefore. In addition, the control system embodies manual means for obtaining continuous wiper operation at selected speed levels, and for arresting wiper operation at the will of the operator.

Accordingly, among my objects are the provision of a windshield cleaning system including automatic means for arresting operation of a wiper unit when the windshield is substantially completely dry; the further provision of a windshield cleaning system including an automatic control for effecting progressive intermittent operation of a wiper unit for intervals of varying duration, and arresting operation of the wiper unit when the windshield is substantially completely dry; the further provision of a windshield cleaning system including a washer unit and a wiper unit, and control means for effecting an automatic cleaning cycle wherein both the washer unit and the wiper unit operate conjointly for an interval, the washer unit is automatically arrested, and the wiper unit is operated intermittently and finally arrested when the windshield is substantially completely dry; and the still further provision of a windshield cleaning system of the aforesaid type including manual means for arresting the automatic wipe cycle or activating and inactivating the windshield cleaning system at the will of the operator.

The aforementioned and other objects are accomplished in the present invention by utilizing a thermal timer in the control circuit of a power driven wiper unit, which thermal timer is responsive to the condition of the windshield as sensed by the load imposed on the wiper motor. Specifically, the improved control system is depicted in combination with an electrically operated wiper unit and an electrically controlled washer unit, but this embodiment is only exemplary since the control system could obviously be modified for use with other power driven wiper units and washer units without departing from the spirit and scope of the present invention.

In the exemplary embodiment disclosed herein, the wiper unit is of the type disclosed in Contant et al. Patent 2,985,024 and the washer unit is of the type disclosed in Ziegler Patent 2,905,962. Thus, the wiper unit includes a unidirectional electric motor coupled through a gear reduction unit to a rotary crank arm for imparting to and fro movement to a linkage drive. The linkage drive is constructed and arranged to impart oscillation to a pair of speed wiper arm and blade assemblies in phase opposition throughout running strokes, and to depressed positions whereat the wiper blades engage the lower reveal molding of the windshield.

The washer unit comprises a pump having interruptible driving connection with the wiper motor for drawing solvent from a reservoir and discharging it through spray nozzles onto the windshield into the paths of movement of the wiper blades thereacross.

The control comprises a rotary wiper switch for selected manual control of the wiper unit, and a pair of push buttons for automatic operation of the wiper unit alone or automatic conjoint operation of the wiper unit with the washer unit.

Further objects and advantages of the present invention will be apparent from the following description, reference being had to the accompanying drawings wherein a preferred embodiment of the present invention is clearly shown.

In the drawings:

FIGURE 3 is an enlarged side view of the control taken in the direction of arrow 3 of FIGURE 2;

FIGURE 4 is a rear view of the control taken in the direction of arrow 4 of FIGURE 3;

FIGURE 5 is a sectional view taken along line 5—5 of FIGURE 3;

FIGURE 6 is a sectional view taken along line 6—6 of FIGURE 4;

FIGURE 7 is an end view taken in the direction of arrow 7 of FIGURE 3;

FIGURE 8 is a fragmentary sectional view taken along line 8—8 of FIGURE 3;

FIGURE 9 is a view similar to FIGURE 8 with the washer button depressed;

FIGURE 10 is a fragmentary sectional view taken along line 10—10 of FIGURE 9;

FIGURE 11 is a view similar to FIGURE 8 with the wiper button depressed;

FIGURE 12 is a fragmentary view taken in the direction of arrow 12 of FIGURE 11;

FIGURE 13 is a view similar to FIGURE 5 depicting manual operation of the control;

FIGURE 14 is a sectional view taken along line 14—14 of FIGURE 13;

FIGURE 15 is a view similar to FIGURE 5 with a manual control in one of its operating positions;

FIGURE 16 is a fragmentary sectional view taken along line 16—16 of FIGURE 15;

FIGURE 17 is a view in elevation of the timer;

FIGURE 18 is a sectional view taken along line 18—18 of FIGURE 17;

FIGURE 19 is an electrical schematic view of the control system;

FIGURE 20 is a graph depicting an automatic wiper unit operation.

FIGURE 21 is a graph depicting current consumption of the electric motor under various windshield conditions.

Figure 1:
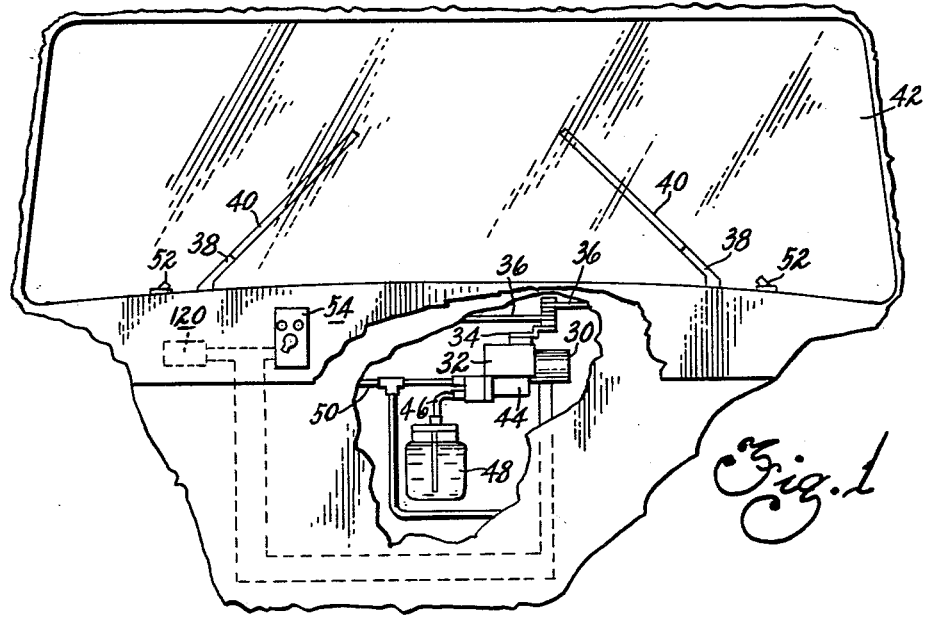
FIGURE 1 is a fragmentary view in elevation, with certain parts broken away, of the interior of a vehicle equipped with the present invention.

With reference to FIGURE 1, the windshield cleaning system of the present invention comprises an electric wiper motor 30 connected to a gear reduction unit 32 having a rotary output crank 34. The single ended output crank 34 is operatively connected to the inner ends of a pair of connecting links 36, the outer ends of which are operatively connected to pivot shafts, not shown, having wiper arms 38 drivingly connected therewith. The wiper arms 38 carry blades 40 which are oscillatable across the outer surface of the windshield 42 in phase opposition. All of the aforesaid components constitute the wiper unit of the present invention.

A washer pump 44 is attached to the gear reduction unit 32 and has an interruptible driving connection therewith. The pump 44 is connected by an intake conduit 46 to a reservoir 48 containing liquid solvent, and by a delivery conduit system 50 to spaced nozzles 52 through which a liquid solvent is sprayed onto the outer surface of the windshield 42 into the paths of the wiper blades 40. The aforesaid described components constitute the washer unit of the present invention.

Figure 2:
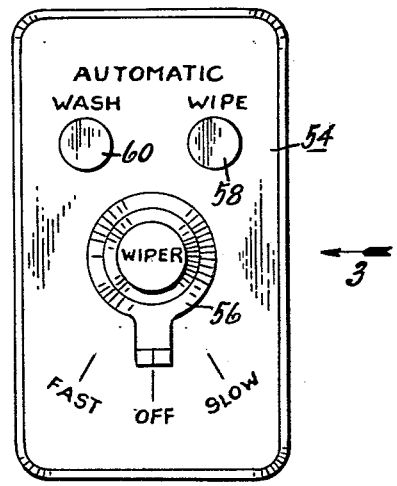
FIGURE 2 is a front view in elevation of the control.

The windshield cleaning system of the present invention comprehends a control unit 54 mounted on the instrument panel of the vehicle which, as seen in FIGURE 2, includes a rotary manual wiper unit control 56, an automatic wiper push button 58 and an automatic washer push button 60. The manual wiper unit control 56 has an "off" position and "slow" and "fast" speed positions as indicated in FIGURE 2. When the automatic wiper button 58 is depressed, the wiper unit operates at low speed.

With reference to FIGURE 19, in the exemplary embodiment disclosed herein, both the wiper unit and the washer unit are electrically actuated. Thus, the wiper motor 30 includes an armature 62, one terminal of which is connected by wire 64 to ground through a bimetal strip to be described. The other terminal of the armature 62 is connected to a series field winding 66 and a switch contact 68. The switch contact 68 is also connected to one end of a shunt field winding 70, the other end of which is connected to a wire 72. The switch contact 68 is engageable by a movable contact 74 controlled by a relay coil 76. The contact 74 is connected to one terminal of a battery 78, the other terminal of which is connected to ground.

The relay coil 76 is connected to wires 80 and 82. Wire 82 is connected to stationary switch contact 84 engageable by movable contact 86 connected to a wire 88. Contact 86 is also engageable by movable switch 90 connected to wire 72. A speed controlling resistor 92 is connected to the wire 72. The wire 88 is connected with movable switch contact 94 which is also connected by wire 96 with the wire 64. Movable contact 94 is engageable with stationary contact 98 which is interconnected by wire 100 to wire 82 and stationary contact 84.

The manual wiper unit control knob 56 is attached to a shaft 102 having a lever 104 thereon. When the knob 56 and shaft 102 are rotated in the counterclockwise direction as shown in FIGURE 2, clockwise as in FIGURE 15, so that contacts 84, 86, 104 and 90 are in engagement, the wiper motor 30 will be energized for low speed. This energizing circuit is completed since the relay coil 76 is energized from the battery 78 through wire 82, contacts 84 and 86, 90 and 104, wires 88, 96 and/or 200 and 64. When the coil 76 is energized, contacts 68 and 74 are moved into engagement thereby energizing the wiper motor 30 from the battery 78. Contacts 86 and 90 short circuit the resistor 92 so that the shunt field winding 70 is fully energized. When the knob 56 and shaft 102 are rotated in the counterclockwise direction as shown in FIGURE 15, clockwise direction as shown in FIGURE 2, lever 104 maintains contacts 94 and 98 in engagement, thus again energizing relay coil 76 through wires 82, 100, contacts 94 and 98 and wires 96, 198, or contact 104 and wire 200, or both. However, at this time, the resistor 92 is connected in series with the shunt field 70 since contacts 86 and 90 remain separated, thus reducing the energization of the shunt field winding 70 so as to increase the speed of the motor 30.

When the manual control knob 56 is moved to the "off" position as depicted in FIGURES 2 and 19, the relay coil 76 is de-energized, but the contacts 68 and 74 remain in engagement until the wiper blades 40 arrive at their depressed parked positions. The wiper blades are parked through a variable crank control mechanism controlled by de-energization of coil 76 in accordance with the aforementioned Patent 2,985,024 and when they arrive at their parked positions, the switch contact 68 is disengaged from the switch contact 74 by a cam 106 actuated through a mechanical linkage 108 from the motor 30.

When the automatic wiper button 58 is depressed, contact 110 engages contact 112. Contact 110 is carried by a leaf spring blade 114 having a hooked end 116 engageable with a latch 118. Accordingly, momentary depression of the button 58 is sufficient to engage the hooked end with the latch 118 so as to maintain contacts 110 and 112 in engagement. With contacts 110 and 112 in engagement, the wiper motor 30 is energized for low speed rotation from the battery 78 through wire 72, contacts 90 and 104 to ground through wire 200. Bimetal timer 120 is connected in the circuit of the relay coil 76 and the motor 30. The bimetal thermal timer comprises a bimetal strip 122 carrying a contact 124, and an ambient temperature compensating strip 126 carrying a contact 128 and a permanent magnet 130. The bimetal strip 122 is connected to the wire 64 on one fork and to ground through wire 198 on the other fork, and carries a third contact 132 as well as contact 124. The contact 132 is engageable with a fourth contact 134 connected by wire 136 to a second relay coil 138 which is connected to the battery 78 by wire 140. The compensating bimetal strip 126 is connected by wire 142 to the switch blade 114.

The latch 118 constitutes the armature of the relay 138, is pivoted on a frame 144 and biased by a coil spring 146 to the position shown in FIGURE 19. As long as the relay coil 138 remains de-energized, the wiper unit operates continuously at low speed subject to the control of the thermal timer. Since the bimetal strip 122 is connected in series with the armature 62 of the wiper motor 30, the total armature current flows through the bimetal strip 122. Hence, the thermal timer 120 is responsive to total motor current, and thus the load on the wiper unit.

It is well recognized that the load seen by the wiper motor 30 depends upon the condition of the windshield over which the wiper blades 40 move. When the windshield is completely wet, the load on the wiper motor 30 is relatively low. As the windshield becomes dry, tacky, or semi-wet, the load imposed on the wiper motor 30 increases substantially.

It is at this time that the bimetal strip 122 becomes heated sufficiently to warp and separate the contacts 124 and 128 so as to de-energize the relay coil 76. When the relay coil 76 is de-energized the wiper blades 40 are automatically parked.

During the intervening rest period, the bimetal strip 122 cools and when it has cooled sufficiently, the contacts 124 and 128 are re-engaged by a snap action by reason of the magnet 130. When the contacts 124 and 128 are re-engaged the wiper unit will again be operated for an indeterminate number of strokes depending on the condition of the windshield 42.

Referring to the graph in FIGURE 20, if moisture has not accumulated on the windshield 42, the duration of the intervals of operation of the wiper unit will decrease progressively until the windshield is substantially completely dry, at which time the wiper unit will make a final stroke or two. When the windshield is substantially completely dry, the bimetal 122 will have warped sufficiently to engage contacts 132 and 134, thus completing the energizing circuit for the relay coil 138. When the relay coil 138 is energized, the latch 118 will be attracted thereby releasing the leaf spring blade 114 so as to separate contacts 112 and 110. Accordingly, it is apparent that the present invention comprehends a completely automatic wiping system for a vehicle windshield wherein the wiper unit will operate intermittently with intervening rest periods until the windshield is substantially completely dry, at which time the wiper unit will be automatically arrested. The wiper blades 49 will automatically be parked during each intervening rest interval. The automatic wiper unit cycle is energized by merely depressing the automatic wiper button 58. The automatic wiper cycle can be discontinued at any time by turning the knob 56 to release the latch 118 through plate 162 and mechanical linkage 158.

The automatic washer button 60, when depressed, closes contacts 148 and 150, as well as closing contacts 110 and 112 through stem 152 which extends through aligned openings in the leaf spring plates carrying contacts 148 and 150. Contact 148 is connected to ground, and contact 150 is connected to the washer control, not shown, through the battery 78 in accordance with the aforementioned Patent 2,905,962. Therefore, when the washer button 60 is depressed, the wiper unit is conditioned for an automatic wiping cycle as hereinbefore described, and the washer unit operates through an automatic cycle to spray liquid solvent onto the windshield 42 for a predetermined number of wiper unit strokes, after which it is automatically arrested.

Referring to FIGURES 3 through 16, an exemplary physical embodiment of the control 54 will be described. The control 54 may comprise a mounting plate 160 of insulating material through which the wiper button 58 and washer button 60 project. The shaft 102 to which the knob 56 is attached also extends through the plate 160. The wiper and washer buttons have pilot ends which extend through holes 168 in a phenolic plate 162. The phenolic plate 162 has a pair of ears which straddle the frame 144 of the relay 138. The phenolic plate 162 is formed with a substantially elongated V-shaped slot 164, which receives a pin 166 attached to lever 104 of the shaft 102. As is apparent from FIGURE 4, the pilot holes 168 in the phenolic plate 162 for the washer and wiper buttons are longitudinally elongated to facilitate a slight longitudinal movement of the phenolic plate 162 as the lever 104 is turned in either direction from the "off" position. The phenolic plate 162 is maintained in engagement with the washer and wiper buttons by a bail type spring wire 170, the ends of which are seated in a boss 172 on the rear side of the mounting plate 160.

The control 54 is shown in the "off" position in FIGURES 3 through 8 and, as seen in FIGURE 5, the spring wire 170 engages a screw 174 carried by the phenolic plate 162. In FIGURE 9 the washer button 60 is shown depressed which results in a tilting movement of the phenolic plate 162 such that the button 60 will close contacts 148 and 150 while the screw 174 or projection on plate 162 will close contacts 110 and 112 thereby resulting in conjoint operation of the washer unit and the wiper unit. As is apparent from FIGURE 10, when the washer button 60 is depressed, and after release thereof, the latch 118 engages the end 116 which may, or may not, be hooked, of the leaf spring 114 so as to maintain the contacts 110 and 112 in engagement. The washer contacts 148 and 150 need only be momentarily engaged to initiate a cycle of operation of the washer unit.

In FIGURES 11 and 12 the wiper button 58 is depressed, thereby again tilting the phenolic plate 162 so as to engage contacts 110 and 112 to initiate an automatic cycle of the wiper unit. At this time the washer contacts 148 and 150 remain disengaged. However, the latch 118 again engages the end 116 of the latch spring 114 to maintain the contacts 110 and 112 in engagement after release of the button 58.

As alluded to hereinbefore, the vehicle operator has full control of the windshield cleaning system at all times, and thus can manually interrupt, or cancel, either the automatic washer cycle or the automatic wiper cycle by merely turning the manual control knob 56 from its "off" position to either of its "on" positions and then returning it to the "off" position. This is accomplished by coaction between the pin 166 and the V-shaped slot 164 in the phenolic plate 162 which imparts longitudinal movement to the phenolic plate 162 towards the relay 138 in such a manner that the phenolic plate 162 moves the latch 118 towards the relay thereby disengaging the latch from the end 116 of the leaf spring 114. In this manner contacts 110 and 112 can be separated thereby de-energizing the wiper unit. The movement imparted to the latch 118 by the phenolic plate 162 is depicted by the full and phantom lines in FIGURE 14.

Referring to FIGURES 15 and 16, when the manual wiper control knob 56 is turned to its high speed position indicated in phantom lines in FIGURE 15, the lever 104 engages contact 94 with contact 98 which, in the physical embodiment depicted is integral with contact 84 and wire 100 shown schematically in FIGURE 19. Conversely, when the lever 104 is moved to the low speed position depicted in full lines in FIGURE 15, the lever engages contact 86 with contact 84 and contact 90 with contact 86. During rotation of the control knob from its "off" position to either its high or low speed position, the phenolic plate 162 moves longitudinally, as aforedescribed, thus imparting movement to the latch 118 which constitutes the armature of the relay, or magnet assembly 138.

Referring to FIGURES 17 and 18, the timer 120 comprises a base 180 of insulating material having a pair of upstanding bosses 182 and 184. The compensating bimetallic strip 126 and the timing bimetallic strip 122 are mounted on opposite sides of the boss 184, an adjustment screw 186 being associated with the ambient temperature compensating bimetallic strip 126. The contact 128 is carried by a second adjustment screw 188, and the permanent magnet 130 is attached to an insulating yoke 190 and the bimetallic strip 126 by a screw 192. The contact 134 is connected to the yoke 190 by a screw 194. As seen particularly in FIGURE 18, the bimetallic strip 122 is formed with a longitudinal slot 196.

Referring to FIGURE 21, with an electric motor driven wiper unit, the current consumption may be on the order of four amperes when the windshield is thoroughly wet, and seven amperes when the windshield is dry. The timer 120 may be calibrated to respond to total motor current of say five and one-half amperes to inactivate the wiper unit on the automatic cycle. Under these circumstances the timer will operate the wiper unit intermittently during misty or light rain conditions with intervening rest intervals, but if the rain should increase, the wiper unit will operate continuously.

From the foregoing, it is apparent that the present invention introduces a new concept and method of cleaning vehicle windshields embodying the conventional manual control for obtaining continuous operation of the wiper unit at the selected speed level, or obtaining automatic wiper unit operation for intervals of varying duration with intervening rest periods until the windshield is substantially completely dry. In addition, the automatic wiper unit control can be coordinated for conjoint operation with a washer unit to effect a completely automatic windshield cleaning cycle in the manner hereinbefore described.

While the embodiment of the present invention as herein disclosed constitutes a preferred form, it is to be understood that other forms might be adopted.

What is claimed is as follows:

1. A windshield cleaning system including a wiper unit and manually activated automatic control means responsive to the surface condition of the windshield to periodically actuate the wiper unit with intervening rest intervals and inactivate the wiper unit when the windshield is substantially completely dry.

2. A windshield cleaning system including a wiper unit comprising a motor for moving a wiper across the windshield throughout a running stroke and arresting the wiper in a parked position outside said running stroke, and manually activated automatic control means responsive to the surface condition of the windshield to activate the motor intermittently and inactivate said motor when the widnshield is substantially completely dry.

3. A windshield cleaning system including a wiper unit comprising a motor for moving a wiper blade across the windshield throughout a running stroke and arresting movement of the wiper blade in a parked position outside said running stroke, and manually actuated automatic control means responsive to the surface condition of the windshield for activating said motor to operate the wiper blade periodically with intervening rest intervals and parking said wiper blade during said intervening rest intervals, said automatic control means inactivating said motor with the wiper blade in its parked position when the windshield is substantially completely dry.

4. A windshield cleaning system including a wiper unit, manually actuated automatic control means responsive to the surface condition of the windshield for effecting intermittent operation of the wiper unit and inactivating said wiper unit when the windshield is substantially completely dry, and a manual control operable to selectively activate and inactivate said wiper unit at the will of the operator and independently of said automatic control means.

5. A windshield cleaning system including a wiper unit, a first manual control for activating said wiper unit, automatic means responsive to the surface condition of said windshield when the first control is operated for periodically activating said wiper unit with intervening rest intervals and finally inactivating said wiper unit when the windshield is substantially completely dry, and a second manual control for activating and inactivating the wiper unit at the will of the operator and independently of said automatic means.

6. A windshield cleaning system including a wiper unit, a washer unit, manually activated automatic control means operable to set both units in operation for conjoint operation, said washer unit being operable to spray liquid solvent onto said windshield for a predetermined interval after which it is automatically arrested, with said automatic control means being responsive to the surface condition of said windshield for effecting intermittent operation of the wiper unit and finally arresting the wiper unit when the windshield is substantially completely dry.

7. A windshield cleaning system including a wiper unit, a washer unit, means to set both units in operation for conjoint operation, means operable during said conjoint operation to continue operation of said washer unit for a predetermined interval and then automatically arrest said washer unit, and automatic control means responsive to the surface condition of said windshield for periodically actuating said wiper unit with intervening rest intervals and finally inactivating said wiper unit when the windshield is substantially completely dry.

8. The windshield cleaning system as set forth in claim 7 including a manual control for activating and inactivating said wiper unit at the will of the operator and independently of said automatic control means.

9. A windshield cleaning system including a wiper unit, a washer unit, a single motor having a continuous driving connection with said wiper unit and an interruptible connection with said washer unit, means to set both units in operation for conjoint operation, means operable to arrest said washer unit after a predetermined interval, and automatic control means responsive to the surface condition of said windshield for effecting intermittent operation of said wiper unit and finally arresting said wiper unit when the windshield is substantially completely dry.

10. A windshield cleaning system including a wiper unit comprising an electric motor for moving a wiper blade across the surface of a windshield, a manually operable control for energizing said motor to impart movement to said wiper blade, and automatic means including a thermal timer connected in circuit with said motor so as to be responsive to the load imposed on said motor and thus respond to the surface condition of said windshield for effecting intermittent operation of said wiper unit and finally arresting said wiper unit when the windshield is substantially completely dry.

11. A windshield cleaning system including a wiper blade, an electric motor operable to move said wiper blade back and forth across said windshield, a first manually operable control for energizing said motor, a thermal timer connected in said motor circuit and responsive to total motor current to effect intermittent operation of said motor and finally arrest said motor when said windshield is substantially completely dry, and a second manually operable control for energizing and de-energizing said motor at the will of the operator and independently of said thermal timer.

12. A windshield cleaning system including a wiper blade, an electric motor for driving said wiper blade back and forth across said windshield, a washer unit having interruptible driving connection with said motor, means to establish the driving connection between said washer and said motor and concurrently energize said motor to effect conjoint operation of said wiper blade and said washer unit, said washer unit including means for automatically arresting the same after a pretermined interval, and an automatic means including a thermal timer connected in circuit with said electric motor so as to respond to total motor current for effecting intermittent operation of said motor and finally de-energizing said motor when the windshield is substantially completely dry.

13. A windshield cleaning system including a wiper unit, and manually activated automatic control means responsive to the surface condition of said windshield for effecting intermittent operation of said wiper unit, the duration of the intervals of wiper unit operation being determined by the surface condition of said windshield and being of progressively reduced duration as the windshield becomes dry so that when the windshield is substantially completely dry the wiper unit will be inactivated.

14. A windshield cleaning system including a wiper blade, an electric motor for driving said wiper blade back and forth across said windshield, a first manually operable control including a switch for energizing said motor to activate said wiper blade, a latch for maintaining said first switch closed, a thermal timer connected in circuit with said motor so as to respond to total motor current and hence to the surface condition of said windshield to periodically de-energize said motor in accordance with the surface condition of said windshield, and a relay operably associated with said latch and controlled by said thermal timer for releasing said switch to inactivate said motor when the windshield is substantially completely dry.

15. A windshield cleaning system including a wiper blade, an electric motor for driving said wiper blade back and forth across said windshield, a control unit for said motor including first manually operable means for energizing said motor, automatic means including a thermal timer connected in circuit with said motor and responsive to the surface condition of said windshield for effecting intermittent operation of said motor and finally arresting said motor when the windshield is substantially completely dry, and second manually operable means for activating and inactivating said motor at the will of the operator and independently of said first means.

16. The windshield cleaning system set forth in claim 15 including a washer unit, and third manually operable means for concurrently activating said washer unit and said motor independently of said first and second manually operable means to effect conjoint operation of said washer unit with said wiper blade.

17. The windshield cleaning system set forth in claim 15 wherein said first manually operable means comprises a first push button and a first switch, said first switch comprising a pair of leaf spring blades one of which has a hooked end, and wherein said automatic means includes a latch for maintaining said switch closed upon release of said push button, and a relay for actuating said latch to release the hooked end of said switch blade, said relay being connected in circuit with said thermal timer so as to be energized when the windshield is substantially completely dry.

18. The windshield cleaning system as set forth in claim 17 including a washer unit, and wherein said control unit includes a second push button and a second pair of leaf spring switch blades, and wherein momentary depression of said second push button engages both pairs of switch blades.

19. The windshield cleaning system as set forth in claim 17 wherein said control unit includes means for mechanically releasing said latch upon movement of said second manually operable means from its "OFF" position.

20. The windshield cleaning system as set forth in claim 19 wherein said last recited means comprises a plate of insulating material, and cam means for moving said plate upon actuation of said second manually operable means.

References Cited in the file of this patent
UNITED STATES PATENTS
2,987,747    Oishei _____ June 13, 1961